(12) United States Patent
Hornby

(10) Patent No.: US 7,219,847 B2
(45) Date of Patent: May 22, 2007

(54) FUEL INJECTOR WITH A METERING ASSEMBLY WITH A POLYMERIC SUPPORT MEMBER AND AN ORIFICE DISK POSITIONED AT A TERMINAL END OF THE POLYMERIC HOUSING

(75) Inventor: Michael J. Hornby, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 161 days.

(21) Appl. No.: 11/014,695

(22) Filed: Dec. 20, 2004

(65) Prior Publication Data

US 2005/0133632 A1 Jun. 23, 2005

Related U.S. Application Data

(60) Provisional application No. 60/531,206, filed on Dec. 19, 2003.

(51) Int. Cl.
*F02M 59/00* (2006.01)
*F02M 61/00* (2006.01)
*F02M 47/02* (2006.01)
*B05B 1/30* (2006.01)

(52) U.S. Cl. ............... 239/88; 239/533.2; 239/533.14; 239/585.1; 239/585.3; 239/585.4; 239/585.5

(58) Field of Classification Search ............... 239/88, 239/89, 91, 533.2, 533.9, 533.14, 585.1, 239/585.3, 585.4, 585.5; 251/129.15, 129.21, 251/127

See application file for complete search history.

(56) References Cited

U.S. PATENT DOCUMENTS

| | | | |
|---|---|---|---|
| 3,769,117 A | 10/1973 | Bowen et al. | |
| 4,951,878 A | 8/1990 | Casey et al. | |
| 5,081,766 A * | 1/1992 | Kellum et al. | 29/890.13 |
| 5,150,842 A | 9/1992 | Hickey | |
| 5,159,915 A | 11/1992 | Saito et al. | |
| 5,803,983 A | 9/1998 | Simandl et al. | |
| 5,823,445 A | 10/1998 | Sofer | |
| 5,893,959 A | 4/1999 | Muellich | |
| 5,915,626 A | 6/1999 | Awarzamani et al. | |
| 5,944,262 A | 8/1999 | Akutagawa et al. | |
| 5,979,866 A * | 11/1999 | Baxter et al. | 251/129.21 |
| 5,996,910 A | 12/1999 | Takeda et al. | |

(Continued)

*Primary Examiner*—Davis Hwu

(57) ABSTRACT

A fuel injector is described that includes a polymeric housing, pole piece, filter assembly, coil assembly, spring member, armature assembly and metering assembly. The housing has a passageway extending between an inlet opening and an outlet opening along a longitudinal axis. The pole piece is disposed in the passageway and has a through opening. The filter assembly has a portion disposed in the through opening of the pole piece. The coil assembly is disposed in the housing to surround the pole piece. The spring member is disposed partly in the pole piece and includes a spring portion contiguous with the portion of the filter assembly. The armature assembly is disposed in the passageway in a first position confronting the end face of the pole piece and in a second position contiguous to an end face of the pole piece. The metering assembly has a seat secured to a polymeric support member. The seat has a first surface contiguous to the closure member in one position of the closure member and a second surface spaced apart from the first surface. The metering disc is secured to the second surface of the seat such that the metering disc is at the outermost end of the fuel injector.

20 Claims, 3 Drawing Sheets

U.S. PATENT DOCUMENTS

| | | |
|---|---|---|
| 5,996,911 A | 12/1999 | Gesk et al. |
| 6,105,884 A * | 8/2000 | Molnar et al. ............ 239/585.1 |
| 6,193,833 B1 | 2/2001 | Gizowski et al. |
| 6,328,232 B1 * | 12/2001 | Haltiner et al. ........... 239/585.1 |
| 6,386,467 B1 | 5/2002 | Takeda |
| 6,464,153 B1 | 10/2002 | Bonnah, II et al. |
| 6,465,757 B1 | 10/2002 | Chen |
| 6,589,380 B2 | 7/2003 | Gnage |
| 6,596,122 B1 | 7/2003 | Saviski et al. |
| 6,631,857 B2 | 10/2003 | Ibrahim et al. |
| 6,782,869 B2 | 8/2004 | Blakley |
| 6,802,929 B2 | 10/2004 | Ruotsalainan |
| 2004/0031562 A1 | 2/2004 | Kaiser et al. |
| 2004/0031777 A1 | 2/2004 | Bauer et al. |
| 2004/0112519 A1 | 6/2004 | Mori |
| 2004/0154737 A1 | 8/2004 | Chen et al. |
| 2004/0231788 A1 | 11/2004 | Chen et al. |

* cited by examiner

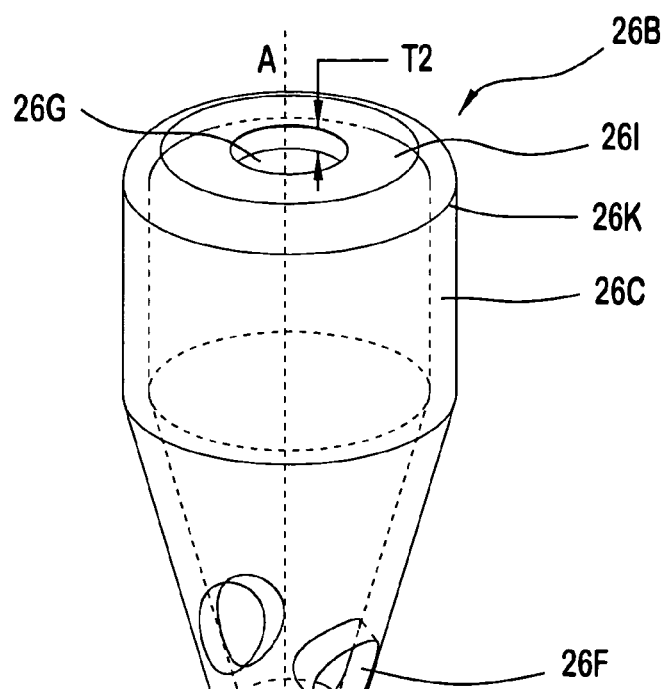
FIG. 3A
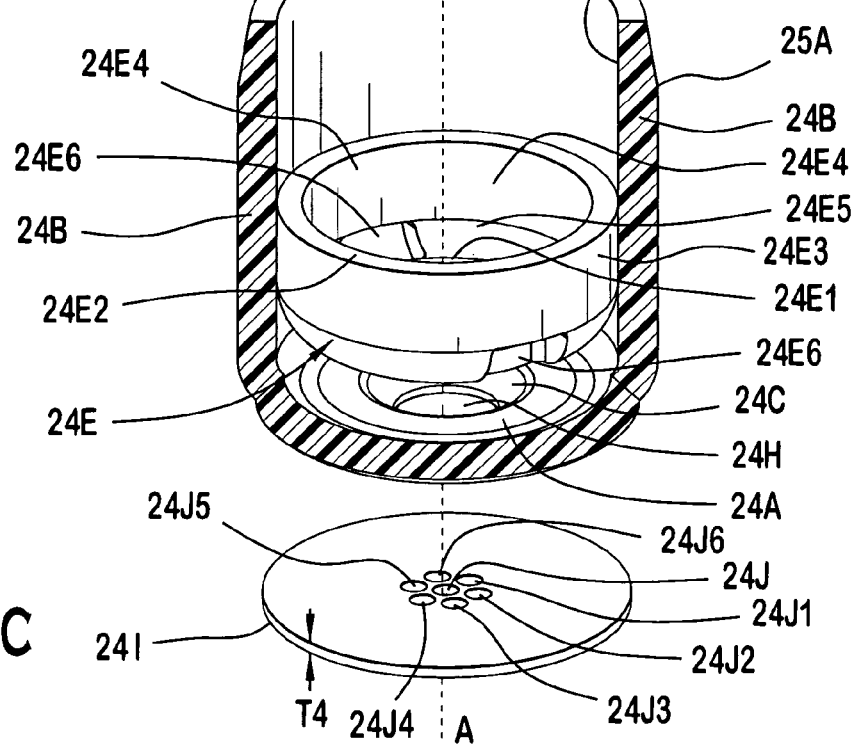
FIG. 3B
FIG. 3C

FUEL INJECTOR WITH A METERING ASSEMBLY WITH A POLYMERIC SUPPORT MEMBER AND AN ORIFICE DISK POSITIONED AT A TERMINAL END OF THE POLYMERIC HOUSING

PRIORITY

This application claims the benefits under 35 U.S.C. § 119 based on Provisional Application Ser. No. 60/531,206, entitled "Plastic Bodied Fuel Injector,", and filed on Dec. 19, 2003, which application is incorporated herein in its entirety into this application.

BACKGROUND OF THE INVENTION

Examples of known fuel injection systems use an injector to dispense a quantity of fuel that is to be combusted in an internal combustion engine. The quantity of fuel that is dispensed is varied in accordance with a number of engine parameters such as engine speed, engine load, engine emissions, etc.

Known electronic fuel injection systems monitor at least one of the engine parameters and electrically operate the injector to dispense the fuel. It is believed that examples of known injectors use electromagnetic coils, piezoelectric elements, or magnetostrictive materials to actuate a valve.

A known fuel injector utilizes a plethora of internal components such as a metallic inlet tube connected to a valve body via a non-magnetic shell with a pole piece interposed therebetween. The inlet tube, valve body, non-magnetic shell and pole piece are generally affixed to each other after a closure assembly and a metering assembly are disposed in the valve body. A solenoid coil is inserted over the assembled components and the entire assembly is molded into the fuel injector.

It is believed that one known fuel injector utilizes a plastic body molded over a solenoid coil to provide a plastic inlet fuel passage with a metallic valve body being coupled to the solenoid coil.

It is believed that another known fuel injector utilizes two separate subassemblies to form the fuel injector. The first subassembly can include a complete coil assembly and electrical connector molded into an outer casing to provide a power group. The second subassembly can include an inlet tube, pole piece, non-magnetic shell valve body, closure assembly and metering assembly affixed together to form a stand alone fuel group. The two sub-assemblies are formed separately and coupled together to provide an operable fuel injector.

While the known fuel injectors are suited to the task of metering fuel, it is believed that the known fuel injectors may have certain assembly or component drawbacks that require extensive manufacturing process to be undertaken to ensure that the injector are suitable for commercial applications. They can include, for example, the necessity for multiple seal points between components to provide leak integrity in the injector and a large number of manufacturing steps that are undertaken. These seals can be effectuated by elastomeric seals, such as, O-rings, or multiple hermetic welds to ensure structural and leak integrity of the known fuel injectors. Others include the potential manufacturing difficulties associated with thermal distortion in welding multiple metallic components at close proximity to each other or the need for a metal valve body with internal resilient seals for leak integrity. Yet another drawback can include the utilization of lift setting components that must be inserted into the valve body of the fuel injector. Thus, it would be advantageous to reduce or even eliminate some of these drawbacks.

SUMMARY OF THE INVENTION

The present invention provides for, in one aspect, a fuel injector that is believed to reduce or eliminate these drawbacks of the known fuel injectors while maintaining substantially the same operative performance. The fuel injector of the present invention utilizes a minimal number of seal points and is designed so that an interface between a potential leak point is hermetically sealed by a polymer-to-polymer seal.

According to one aspect of the present invention, the fuel injector includes a housing, pole piece, filter assembly, coil assembly, spring member, armature assembly, metering assembly, and a metering disc. The housing has a passageway extending between an inlet opening and an outlet opening along a longitudinal axis. The pole piece is disposed in the passageway and has a through opening. The filter assembly has a portion disposed in the through opening of the pole piece. The coil assembly is disposed in the housing to surround the pole piece. The spring member is disposed partly in the pole piece and includes a spring portion contiguous with the portion of the filter assembly. The armature assembly is disposed in the passageway in a first position confronting the end face of the pole piece and in a second position contiguous to an end face of the pole piece. The metering assembly has a seat secured to a polymeric support member. The seat has a first surface contiguous to the closure member in one position of the closure member and a second surface spaced apart from the first surface. The metering disc is secured to the second surface of the seat such that the metering disc is at the outermost end of the fuel injector.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 3A is a perspective view of an armature assembly for the fuel injector of FIG. 1.

FIG. 3B is a cut-away perspective view of a metering assembly including a metering disc for the fuel injector of FIG. 1.

FIG. 3C is a perspective view of a metering disc for the fuel injector of FIG. 1.

DETAILED DESCRIPTION OF THE PREFERRED EMBODIMENTS

Figure 1:
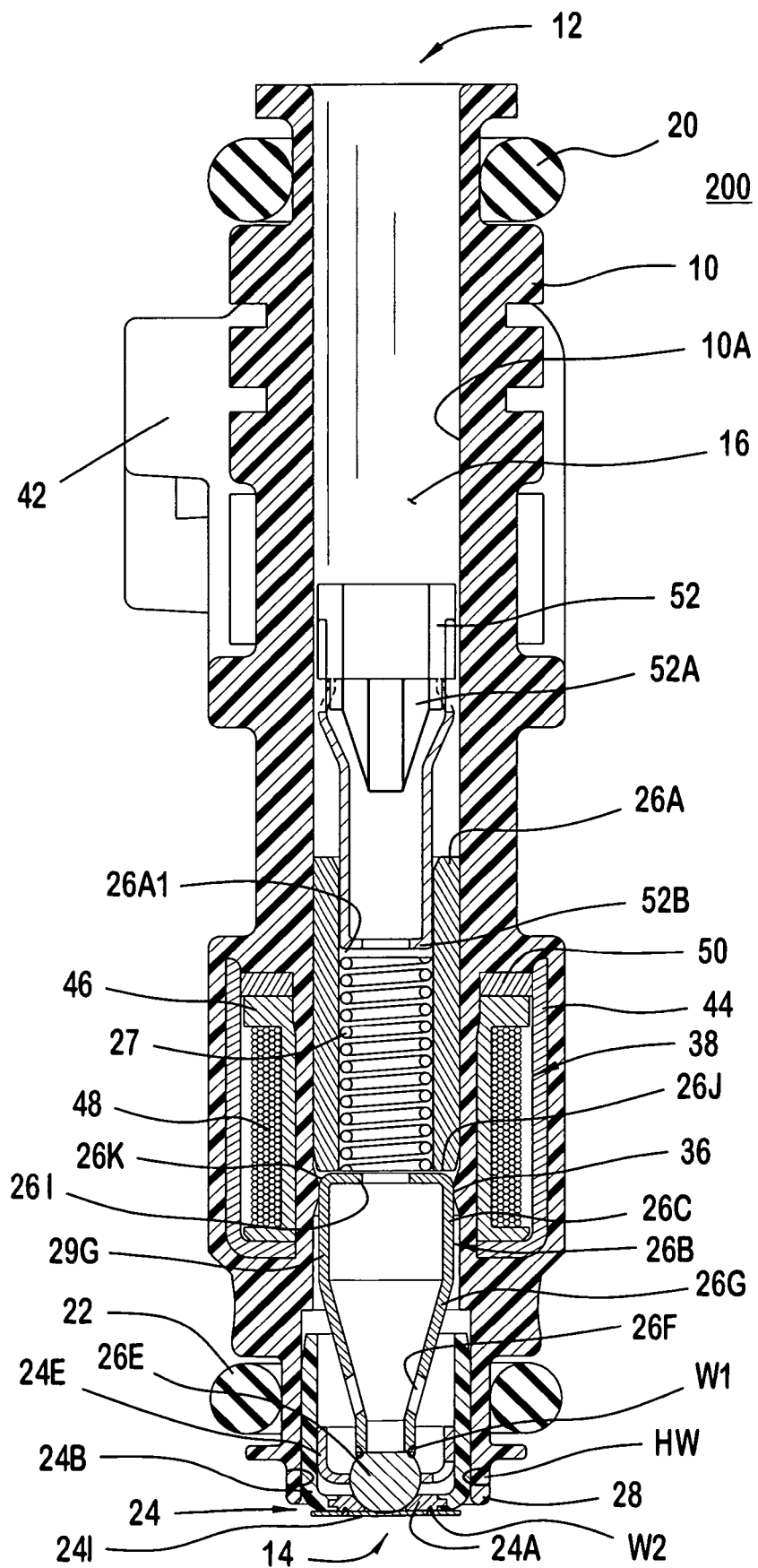
FIG. 1 is a representation of a fuel injector according a preferred embodiment.
Figure 2:
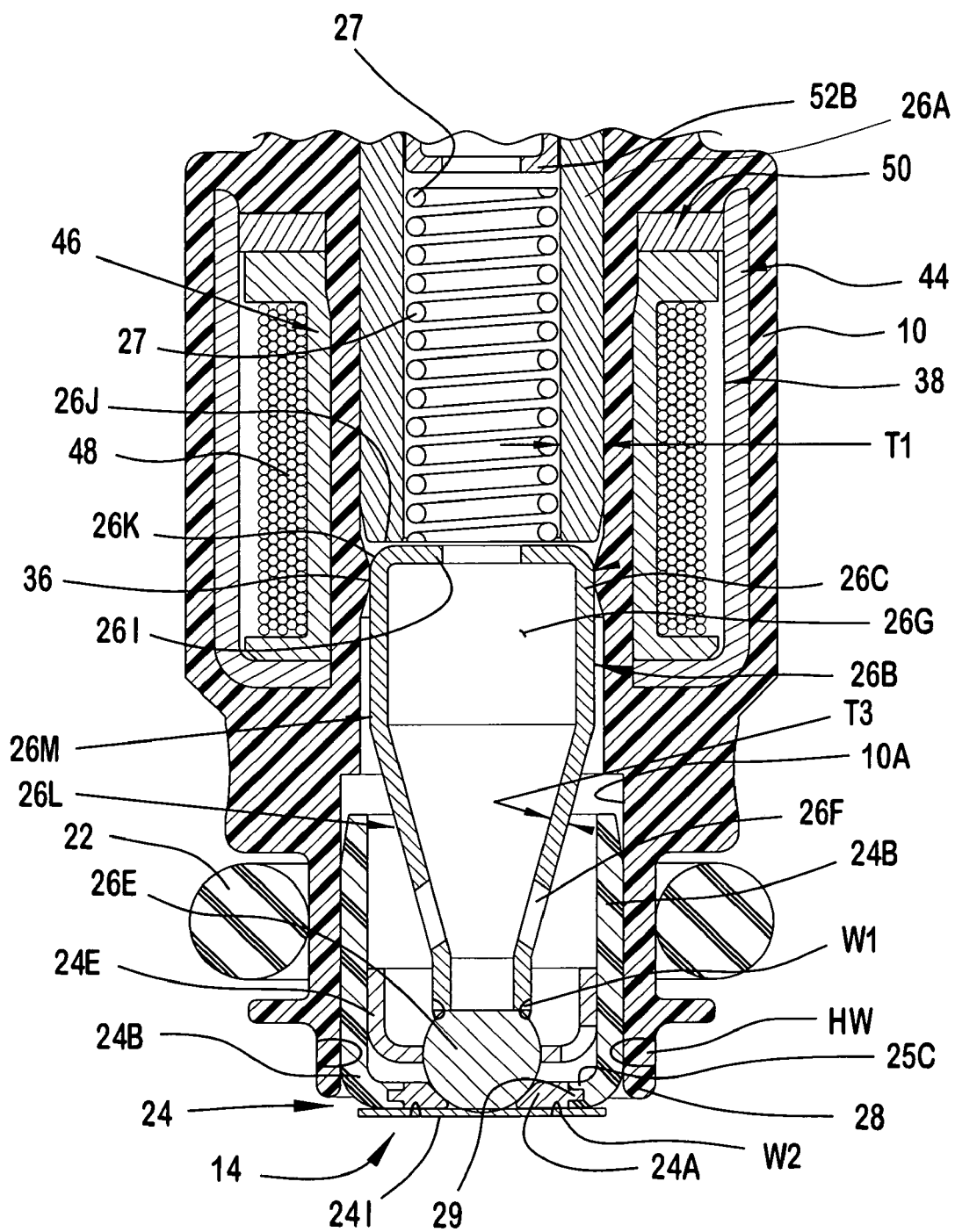
FIG. 2 is a close up of the fuel injector of FIG. 1.

FIGS. 1–3 illustrate the preferred embodiments of a fuel injector 100. Referring to FIGS. 1 and 2, the fuel injector 100 includes a continuous polymeric housing 10 extending from an inlet 12 to an outlet 14 along a longitudinal axis A—A. The polymeric housing 10 includes a polymeric wall surface or bore 10A that directly faces the longitudinal axis A—A to define a passage 16 in which fuel can flow from the inlet 12. The passage 16 includes the polymeric bore 10A that extends from a first external seal 20 proximate the inlet 12 to a second external seal 22 proximate an outlet 14 along the longitudinal axis A—A. Disposed within a portion of the polymeric bore 10A is a metering assembly 24 proximate the second external seal 22. A closure assembly 26 is disposed proximate the metering assembly 24, which is coupled to a rim portion 28 at the outlet end 14 of the polymeric housing 10. A portion of the closure assembly 26 is disposed in the polymeric bore 10A and between the first and second external seals 20, 22. The passage 16 can be defined by a plurality of diameters for the polymeric bore 10A. The polymeric bore 10A can also include an inward (i.e., towards the longitudinal axis A—A) surface to define a guide surface 36 for a reciprocable closure member. The inward surface preferably includes a convex surface. The polymeric housing 10 can be formed from a suitable polymeric material such as, for example, Nylon 6—6 with about 30 percent glass filler.

As shown in FIG. 1, the polymeric housing 10 provides a complete solenoid coil subassembly that is ready for assembly with the metering and closure assemblies. In particular, the polymeric housing 10 includes a solenoid coil assembly 38 disposed within the polymeric housing 10 so that no part of the coil assembly 38 extends outside the boundary of the polymeric housing 10. The solenoid coil assembly 38 is connected to at least one electrical terminal (not shown) formed on an electrical connector portion 42 of the polymeric housing 10. The terminal and the electrical harness connector portion 42 can engage a mating connector, e.g., part of a vehicle wiring harness (not shown), to facilitate connecting the injector 100 to an electrical power supply (not shown) for energizing the electromagnetic coil 48.

The coil assembly 38 includes a coil housing 44 disposed about the longitudinal axis A—A to surround a bobbin 46 and at least one wire coiled about the bobbin 46 to form an electromagnetic coil 48. The coil housing 44, which provides a return path for magnetic flux, generally takes the shape of a ferro-magnetic cylinder surrounding the electromagnetic coil 48. A flux washer 50 can abut a top surface of the bobbin 46 so that the flux washer 50 is in physical contact with the coil housing 44. The flux washer 50 can be integrally formed with or separately attached to the coil housing 44. The coil housing 44 can include holes, slots, or other features to break up eddy currents, which can occur when the coil 48 is de-energized.

The coil assembly 38 can be preferably constructed as follows. A plastic bobbin 46 is molded with at least one electrical contact extending from the bobbin 46 so that the peripheral edge of the contact can be mated with a contact terminal for electrical communication between the coil and a power source. A wire for the electromagnetic coil 48 is wound around the plastic bobbin 46 a predetermined number of times and connected to the at least one electrical contact portion. The electromagnetic coil 48 (with bobbin 46) is placed into the coil housing 44. An electrical terminal, which is pre-bent to a desired geometry, is then electrically connected to each electrical contact portion provided on the bobbin 46. Thereafter, the polymeric housing 10 can be formed by a suitable technique such as, for example, thermoset casting, compression molding or injection molding. The polymeric housing 10, e.g., an overmold, provides a structural casing for the injector 100 and provides predetermined electrical and thermal insulating properties. In a preferred embodiment, the polymeric housing 10 is formed by injection molding around the coil assembly 38 and the electrical connector, i.e., an insert-molding so that the metering assembly can be affixed to the polymeric housing 10. The insert-molding hermetically seals the coil assembly 38 from contamination with fuel flow through the polymeric fuel passage 16.

Referring to FIGS. 1, 2, 3, and 3B, the metering assembly 24 includes a seat 24A that can be any suitable material such as, for example, plastic, ceramic or metal, long as it provides a suitably sealing surface. In the preferred embodiments, the seat 24A is formed of metallic material, and is secured to a polymeric support member 24B with a tab 29 disposed circumferentially around the perimeter of the seat 24A. That is, as the seat 24A and its tab 29 are insert-molded, the tab 29 is captured between the seat 24A and the polymeric molding material that, upon curing of the polymeric material, becomes the polymeric support member 24B. The tab 29 is believed to seal the interface between dissimilar materials being insert-molded. Consequently, in the event that thermal cycling could cause separation in the interface between the metallic seat and the polymeric support member, the tab 29 would be able to maintain a seal therebetween. Adhesive can be applied to the tab 29 to provide for additional bonding strength during the insert molding process.

A metering disc 24I is secured to the metallic seat 24A or to the polymeric support member 24B. The metering disc 24I may be secured to the metallic seat 24A by a weld W2 or a suitable attachment technique. The polymeric support member 24B includes an outer cylindrical wall surface 25A and an inner cylindrical wall surface 25B. The distal end of polymeric support member 24B, proximate to the outlet 14, includes an annulus or slot 25C that is orientated generally perpendicular to the longitudinal axis A—A. The slot receives the tab 29 of the metering disc 24I as shown in FIGS. 2 and 3B.

The cylindrically shaped polymeric support member 24B may receive a cup-shaped guide member 24E. The guide member 24E can be formed from a suitable material such as, for example, polymeric, ceramic or metallic. Preferably, the guide member is a stamped metallic member press-fitted into the inner cylindrical wall surface 25B to a predetermined location with respect to the seat 24A. In FIGS. 2 and 3B, the guide member 24E includes a cylindrical wall portion 24E2, a base portion 24E5, a center aperture 24E1, and at least one offset aperture 24E6.

The wall portion 24E2 has an outer wall surface 24E3 and an inner wall surface 24E4. The outer wall surface is contiguous with a portion of the inner cylindrical wall surface 25B of the polymeric support member 24B. The base portion 24E5 is preferably disc-shaped and extends substantially perpendicular to the wall portion 24E2. The center of the base portion 24E5 is aligned with the longitudinal axis A—A of the fuel injector.

At the center of the base portion, the aperture 24E1 is disposed about the longitudinal axis A—A. The aperture 24E1 is sufficiently large enough to allow the maximum diameter of the closure member 26E to pass through it and to guide the closure member along the longitudinal axis A—A between its open and closed positions.

The offset apertures 24E6 are offset with respect to the longitudinal axis A—A and may be located around the perimeter of the base portion 24E5. Because the base portion is disc-shaped, the offset apertures at the perimeter may be a compound curved through opening. The offset apertures 24E6 can be a suitable shape that effectively allows fuel to flow from passage 16 to the seat 24A.

The outer cylindrical wall surface 25A of the polymeric support member 24B, as shown in FIG. 2, is preferably configured to provide a suitable fit, e.g., locational to light press fit, with the inner surface of the polymeric bore 10A.

The metallic seat 24A can be provided with the polymeric support member 24B by a suitable technique such as, for example, insert molding the metallic seat 24A with a suitable polymeric material. In the preferred embodiment of FIG. 1, the material used for the polymeric housing 10 and bobbin 46 is Nylon 6—6 with about 30% by weight glass filler with BASF® Ultramid A3WG6LT as the material for the polymeric support member 24B. In the preferred embodiment of FIG. 2, the material used for the bobbin 46 and support member 24B is Nylon 6—6 with about 30% by weight glass filler with BASF® Ultramid A3WG6LT as the material for the housing 10.

The metallic seat 24A defines a seat orifice 24H generally centered on the longitudinal axis A—A and through which fuel can flow into the internal combustion engine (not shown). The seat 24A includes a sealing surface 24C1 surrounding the seat orifice 24H. The sealing surface, which faces the interior of the inner cylindrical wall surface 25B, can be frustoconical or concave in shape, and can have a finished or coated surface. Opposite the sealing surface 24C1 is an end surface 24C2 of the seat. The end surface 24C2 is spaced apart over a suitable distance along the longitudinal axis. Preferably, the metallic seat 24A is a stainless steel seat.

A metering disc 24I can be used in connection with the seat 24A to provide at least one precisely sized and oriented metering orifice 24J in order to obtain a particular fuel spray pattern. Precisely sized and oriented metering orifices 24J can be disposed on the center axis of the metering disc 24I preferably, the metering orifices 24J can disposed off-axis, and oriented in any desirable angular configuration relative to one or more reference points on the fuel injector 100. As shown in FIG. 3C, the metering disc 24I comprises a center metering orifice 24J disposed along the longitudinal axis A—A. Surrounding the center metering orifice 24J are six metering orifices 24J1, 24J2, 24J3, 24J4, 24J5, 24J6 preferably evenly disposed on the metering disc 24I. The metering orifices 24J, 24J1, 24J2, 24J3, 24J4, 24J5, 24J6 can be oriented generally parallel to the longitudinal axis A—A and may be diametrically disposed, at various arcuate distances with respect to each other. Preferably, the metering orifices may have a diameter of about 0.150 to 0.5 millimeters. The metering disc 24I has a thickness T4 and may be made of any suitable material such as, for example, silicon, plastic, ceramic, metal, or mixture thereof. In the preferred embodiments, the metering disc 24I is formed of metallic material, the thickness T4 of the metering disc 24I can be from about 100 to about 300 microns and the outer diameter of the disc 24I can be from about 3 millimeters to about 7 millimeters, and is secured to a polymeric support member 24B or seat 24A by the weld W2.

Referring to FIGS. 1, 2, and 3A, the closure assembly 26 includes a pole piece 26A and an armature assembly 26B configured to be magnetically coupled to the solenoid coil assembly 38 in a fully assembled fuel injector 100. The pole piece 26A can be formed as a cylindrical component with a passage 26A1 extending through the pole piece 26A. The pole piece 26A can be formed by a suitable technique such as cast, machined, pin rolled with external barbs or a combination of these techniques. The pole piece passage 26A1 includes a resilient member 27 disposed in the pole piece passage 26A1. The outer surface of the pole piece 26A can be provided with recesses or projections (not shown) to assist in retention of the pole piece 26A once the pole piece 26A has been press-fitted to a desired location in the polymeric bore 10A as shown in FIGS. 1 and 2. The convex surface of the polymeric bore 10A can also secure the retention of the pole piece 26A.

A filter assembly 52 (with a filter element 52A and an adjusting tube 52B) is also disposed in the polymeric bore 10A. As shown in FIG. 1, the filter assembly 52 includes a first end and a second end. A gap is provided along a central portion of the filter assembly 52. The adjusting tube 52B is partially disposed in the pole piece passage 26A1 at the second end of the of the filter assembly 52. The adjusting tube 52B engages the resilient member 27 and adjusts the biasing force of the resilient member 27 with respect to the pole piece 26A. The filter element 52A is retained at the first end of the filter assembly 52 spaced from the adjusting tube 52B portion and outside of the pole piece passage 26A1 so that the gap between the filter assembly 52 and the polymeric bore 10A is provided therebetween. In the preferred embodiments, the adjusting tube 52B provides a reaction member against which the resilient member 27 reacts in order to close the armature assembly 26B when the solenoid coil assembly 38 is de-energized. The position of the adjusting tube 52B can be retained with respect to the pole piece 26A or the polymeric housing 10 by an interference fit between an outer surface of the adjusting tube 52B and an inner surface of the pole piece passage 26A1. Thus, the position of the adjusting tube 52B with respect to the pole piece 26A can be used to set a predetermined dynamic characteristic of the armature assembly 26B.

Referring to FIGS. 1 and 2, the armature assembly 26B includes an armature 26C, which is secured to a closure member 26E. The closure member 26E can be of any suitable shape, such as, for example, cylindrical, semi-spherical or spherical. In the case of a spherical shaped closure member 26E, i.e., a spheroidal member, the spheroidal member can be connected to the elongated section 26D at a diameter that is less than the diameter of the spheroidal member. Such a connection would be on side of the spheroidal member that is opposite contiguous contact with the seat 24A. The elongated section 26D may be secured to the closure member 26E by a weld W1. As noted earlier, the guide member 24E, proximate the seat 24A, can slidingly engage the outer surface of the spherical closure member. The cup-shaped guide member 24E can facilitate alignment of the armature assembly 26B along the longitudinal axis A—A, and can reduce flux leakage to the closure member 26E.

At least one aperture 26F can be formed through a wall surface 26L of the armature 26C. The apertures 26F, which can be of any shape, are preferably non-circular, e.g., axially elongated, to facilitate the passage of gas bubbles. For example, in the case of a separate armature tube that is formed by rolling a sheet substantially into a tube, the apertures can be an axially extending slit defined between non-abutting edges of the rolled sheet. However, the apertures 26F, in addition to the slit, would preferably include openings extending through the sheet. The apertures 26F provide fluid communication between the armature passage 26G and the fuel outlet 14.

The closure member 26E is movable between a closed configuration, as shown in FIGS. 1 and 2, and an opened configuration (not shown). In the closed configuration, the closure member 26E contiguously engages a seat surface of the metallic seat 24A to prevent fluid flow through the seat orifice 24H. In the open configuration, the closure member 26E is spaced from the seat surface to permit fluid flow through the seat orifice 24H.

A radial end face 26I of the armature 26C is configured to contact a radial end face 26J of the pole piece 26A when the armature 26C is moved by magnetic flux generated by the solenoid coil assembly 38. In the embodiment illustrated in FIGS. 1 and 2, the end of the resilient element 27 is configured to abut the radial end face 26I of the armature 26C.

In the preferred embodiments illustrated in FIGS. 1 and 2, surface treatments can be applied to at least one of the end face of the pole piece 26A or the armature 26C to improve the armature's response, reduce wear on the impact surfaces and variations in the working air gap between the respective end faces. The surface treatments can include coating, plating or case-hardening. Coatings or platings can include, but are not limited to, hard chromium plating, nickel plating or keronite coating. Case hardening on the other hand, can include, but are not limited to, nitriding, carburizing, carbonitriding, cyaniding, heat, flame, spark or induction hardening.

The surface treatments will typically form at least one layer of wear-resistant materials on the respective end faces. These layers, however, tend to be inherently thicker wherever there is a sharp edge, such as between junction between the circumference and the radial end face of either portions. Further, this thickening effect results in uneven contact surfaces at the radially outer edge of the end portions. However, by forming the wear-resistant layers on at least one of the end faces, where at least one end portion has a surface generally oblique to longitudinal axis A—A, both end faces can be substantially in even contact with respect to each other when the solenoid coil assembly 38 is energized.

Since the surface treatments may affect the physical and magnetic properties of the ferromagnetic portion of the armature assembly 26B or the pole piece 26A, a suitable material, e.g., a mask, a coating or a protective cover, surrounds areas other than the respective end faces during the surface treatments. Upon completion of the surface treatments, the material is removed, thereby leaving the previously masked areas unaffected by the surface treatments.

In the preferred embodiment illustrated in FIG. 2, the armature 26C is formed by stamping a cylindrical workpiece of substantially constant thickness into the final configuration shown herein. As a function of the stamping process, a cylinder end portion 26M of the armature 26C is rolled inward so that an annular end face 26I is formed with an outer edge 26K being imbued with a radiused surface of curvature rotated about the longitudinal axis A—A. This allows a surface coating to be formed on the radiused surface 26K such that the coating is thicker at the junction between the radiused surface and the outer cylindrical wall surface of the armature 26C. By having a thicker coating at this junction, the contact between the end faces of the pole piece 26A and the armature 26C is believed to be in substantially even contact with each other. It should be noted that the respective wall thickness T2 of the end face 26I and the wall thickness T3 of the aperture 26F are substantially the same for the stamped armature 26C. This feature allows for an armature assembly that is less than 0.9 grams in mass, which is believed to provide for an armature assembly with the ability to accelerate to a full open or close position quicker than the known armature assembly.

Alternatively, the armature 26C can be formed by deep drawing a generally flat workpiece through a suitable die. The armature lengths can be made shorter or longer by implementing a different length of elongated section 26D. As utilized, the armature 26C is a ferromagnetic member.

According to the preferred embodiments, the magnetic flux generated by the electromagnetic coil 48 flows in a circuit that includes the pole piece 26A, the armature assembly 26B, the coil housing 44, and the flux washer 50. The magnetic flux moves along the coil housing 44 to the base of the coil housing 44, through the polymeric housing 10 across a radial (relative to axis A—A) or parasitic airgap to the armature 26C, and across an axial (relative to axis A—A) or working air gap towards the pole piece 26A, thereby lifting the armature 26C and closure member 26E off the seat 24A. As can further be seen in FIGS. 1 or 2, the thickness T1 of the cross-section of the impact surface of pole piece 26A is greater than the thickness T2 of the cross-section of the impact surface of the armature 26C. The smaller cross-sectional area T2 allows the armature 26C to be lighter, and at the same time, causes the magnetic flux saturation point to be formed near the working air gap between the pole piece 26A and the armature 26C, rather than within the pole piece passage 26A1. Furthermore, since the armature 26C is partly within the interior of the electromagnetic coil 48, the magnetic flux is believed to be denser, leading to a more efficient electromagnetic coil 48. In the embodiment of FIG. 1, the ferro-magnetic closure member 26E is magnetically decoupled from the armature 26C via the non-magnetic elongated section 26D, which reduces flux leakage of the magnetic circuit, thereby improving the efficiency of the electromagnetic coil 48.

In the preferred embodiments, the fuel injector 100 can be assembled as follows. A polymeric fuel injector body 10 with an insert-molded solenoid coil assembly 38 is provided, as shown in FIG. 1. The metering assembly 24 is fitted into the polymeric bore 10A of the outlet 14 of the polymeric housing 10 and these components are then bonded to each other by a suitable bonding technique such as, for example, UV light activated adhesive, thermal bonding, or laser welding to form a hermetic seal HW. In the preferred embodiments, the metering assembly 24 is bonded to the outlet by a suitable structural adhesive or by laser welding.

As shown in FIG. 1, a suitable radiant energy beam may be passed through the rim portion 28 to the outer cylindrical wall surface 25A of the polymeric support member 24B, at which point the outer surface of the rim portion 28 begins to melt under radiant energy beam. The melting of the outer surface of the rim portion 28 is believed to cause the outer cylindrical wall surface 25A to also begin melting, which leads to a fused portion of polymeric materials provided by the rim portion 28 and the outer cylindrical wall surface 25A. As the components and the radiant energy source are rotated relative to each other, the fused portion forms a continuous seam, which provides a hermetic seal HW at the interface of the rim portion 28 and the outer cylindrical wall surface 25A against a flow of fuel in the polymeric bore 16. Details of the technique to form the hermetic seal HW via adhesive or laser welding are also disclosed in copending U.S. patent application entitled "Method of Polymeric Bonding Fuel System Components," Ser. No. 11/014,693 filed on the same date as this application, which copending application is incorporated herein by reference in its entirety into this application.

The armature assembly 26B is inserted into the polymeric bore 10A for contiguous engagement with the metering assembly 24, which form a valve assembly that regulates flow of fuel from the fuel injector 100. The pole piece 26A is press-fitted to a predetermined location within the polymeric bore 10A so that a lift distance (i.e., the distance the armature assembly 26B travels to close a working air gap with the pole piece 26A) of the armature assembly 26B is defined by this predetermined location. The resilient element 27 is inserted into the pole piece passage 26A1 so that one end contiguously engages the closure assembly. The filter assembly 52 is press-fitted into the pole piece passage 26A1 so that the second end of the filter assembly 52 preloads the resilient element 27 against the armature assembly 26B to provide for the closure assembly 26. The external seals, preferably Viton type O-rings, are installed on recessed portions proximate the inlet 12 and outlet 14 of the fuel injector 100. At this point, the fuel injector 100 is ready to be calibrated before being tested. The calibration can involve modifying the preload force of the resilient element 27 such as, for example, by repositioning the adjusting tube/filter assembly 52 along axis A—A while flowing fuel through the fuel injector 100 to achieve a desired opening time for the closure member 26E. Subsequently, the fuel injector 100 can be tested (e.g., flow or leak testing) prior to being shipped to customers.

In operation, the electromagnetic coil 48 is energized, thereby generating magnetic flux in the magnetic circuit. The magnetic flux moves armature assembly 26B (along the axis A—A, according to a preferred embodiment) towards the pole piece 26A to close the working air gap. This movement of the armature assembly 26B separates the closure member 26E from the seat 24A and allows fuel to flow from the fuel rail (not shown), through the polymeric inlet bore passage 16, the pole piece passage 26A1, the through-bore 26G of the armature 26C, the apertures 26F between the seat 24A and the closure member 26E, through the seat orifice 24H, and finally through the metering disc 24I into the internal combustion engine (not shown). When the electromagnetic coil 48 is de-energized, the armature assembly 26B is moved by the bias force of the resilient member 27 to contiguously engage the closure member 26E with the seat 24A, and thereby prevent fuel flow through the injector 100.

Details of the preferred embodiments are also described in the following copending applications: (1) "Polymeric Bodied Fuel Injector," Ser. No. 11/014,694, (2) "Method of Polymeric Bonding Fuel System Components," Ser. No. 11/014,693, (3) "Polymeric Bodied Fuel Injector With A Valve Seat And Elastomeric Seal Molded To A Polymeric Support Member" Ser. No. 11/014,692, (4) "Fuel Injector With A Metering Assembly Having A Seat Molded to A Polymeric Support Member," Ser. No. 11/014,691, (5) "Fuel Injector With A Metering Assembly Having At Least One Annular Ridge Extension Between A Valve Seat and A Polymeric Valve Body," Ser. No. 11/014,699, (6) "Fuel Injector With An Armature Assembly Having A Continuous Elongated Armature And A Metering Assembly Having A Seat And Polymeric Support Member," Ser. No. 11/014,698, (7) "Fuel Injector With A Metering Assembly Having A Seat Secured To Polymeric Support Member Having A Surface Surrounding A Rim Of A Polymeric Housing And A Guide Member Disposed In The Polymeric Support Member," Ser. No. 11/014,697, (8) "Fuel Injector With A Metering Assembly Having A Polymeric Support Member Which Has An External Surface Secured To A Bore Of A Polymeric Housing And A Guide Member That Is Disposed In The Polymeric Support Member," Ser. No. 11/014,696, and (9) "Method of Manufacturing Polymeric Fuel Injectors," Ser. No. 11/015,032, which are incorporated herein by reference in their entireties into this application.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

The invention claim is:

1. A fuel injector comprising:
   a polymeric housing having a passageway extending between an inlet opening and an outlet opening along a longitudinal axis;
   a pole piece disposed in the passageway, the pole piece having a through opening;
   a filter assembly having a portion disposed in the through opening of the pole piece;
   a coil assembly disposed in the polymeric housing to surround the pole piece;
   a spring member disposed partly in the pole piece and including a spring portion contiguous with the portion of the filter assembly;
   an armature assembly disposed in the passageway in a first position confronting the pole piece and in a second position contiguous to an end face of the pole piece, the armature assembly having a closure member reciprocable along the longitudinal axis;
   a metering assembly having a seat secured to a polymeric support member, the seat having a first surface contiguous to the closure member in one position of the closure member and a second surface spaced apart from the first surface; and
   a metering disc secured to the second surface of the seat such that the metering disc is at the outermost end of the fuel injector.

2. The fuel injector of claim 1, wherein the metering disc comprises a generally planar metering disc having a plurality of metering apertures extending through the disc.

3. The fuel injector of claim 2, wherein the seat comprises a metallic seat.

4. The fuel injector of claim 3, wherein the polymeric support member comprises a polymeric member secured to a polymeric bore of the polymeric housing.

5. The fuel injector of claim 4, wherein the polymeric support member comprises a generally cylindrical wall that extends over a first length along the longitudinal axis, the cylindrical wall having an inner surface disposed at an inside radius from the longitudinal axis.

6. The fuel injector of claim 5, wherein metering assembly further comprises a guide member disposed in a pocket of the polymeric support member having a central aperture to guide the closure member as the closure member reciprocates along the longitudinal axis and at least one aperture offset to the central aperture to permit fuel flow to the seat.

7. The fuel injector of claim 6, wherein the guide member comprises a guide member press-fined into the pocket of the polymeric support member.

8. The fuel injector of claim 1, wherein the polymeric support member comprises a polymeric support member secured to a polymeric passage of the polymeric housing.

9. The fuel injector of claim 8, wherein the polymeric support member comprises a member bonded to the polymeric passage.

10. The fuel injector of claim 9, wherein the armature assembly comprises a first wall having a first surface confronting the end face of the pole piece and a second wall extending along the longitudinal axis, the first and second walls having substantially the same thickness, the first surface including a generally planar surface and a coating disposed on at least one of the planar surface and the end face of the pole piece.

11. The fuel injector of claim 10, wherein the first wall comprises a first through opening extending through the first wall to define an annulus.

12. The fuel injector of claim 11, wherein the second wall comprises at least a second through opening extending through the second wall, the at least second through opening in fluid communication with the first through opening.

13. The fuel injector of claim 12, wherein the second wall comprises first, second and third portions extending along the longitudinal axis, the first portion defining a generally cylindrical wall, the second portion defining a truncated generally conical wall, and the third portion defining a generally cylindrical wall.

14. The fuel injector of claim 1, wherein the thickness of the first wall comprises a thickness of less than 1 millimeter.

15. The fuel injector of claim 14, wherein the first wall comprises a curved wall portion proximate the perimeter of the annulus, the curved wall portion contiguous to the first portion of the second wall.

16. The fuel injector of claim 15, wherein the armature assembly comprises an armature assembly having a mass of less than 0.9 grams.

17. The fuel injector of claim 16, wherein the closure member comprises a truncated spherical member.

18. The fuel injector of claim 1, wherein the passageway comprises a plurality of different diameters along the longitudinal axis.

19. The fuel injector of claim 18, wherein the passageway comprises a projection that extends towards the longitudinal axis to define a guide surface, the guide surface contiguous to the first portion of the second wall of the armature assembly.

20. The fuel injector of claim 19, wherein the polymeric housing comprises a substantially nylon body enclosing the coil assembly.

* * * * *